Sept. 1, 1925.
R. R. ROBERTSON
PHOTOGRAPHIC COPYING APPARATUS
Filed April 13, 1922 6 Sheets-Sheet 1
1,551,698
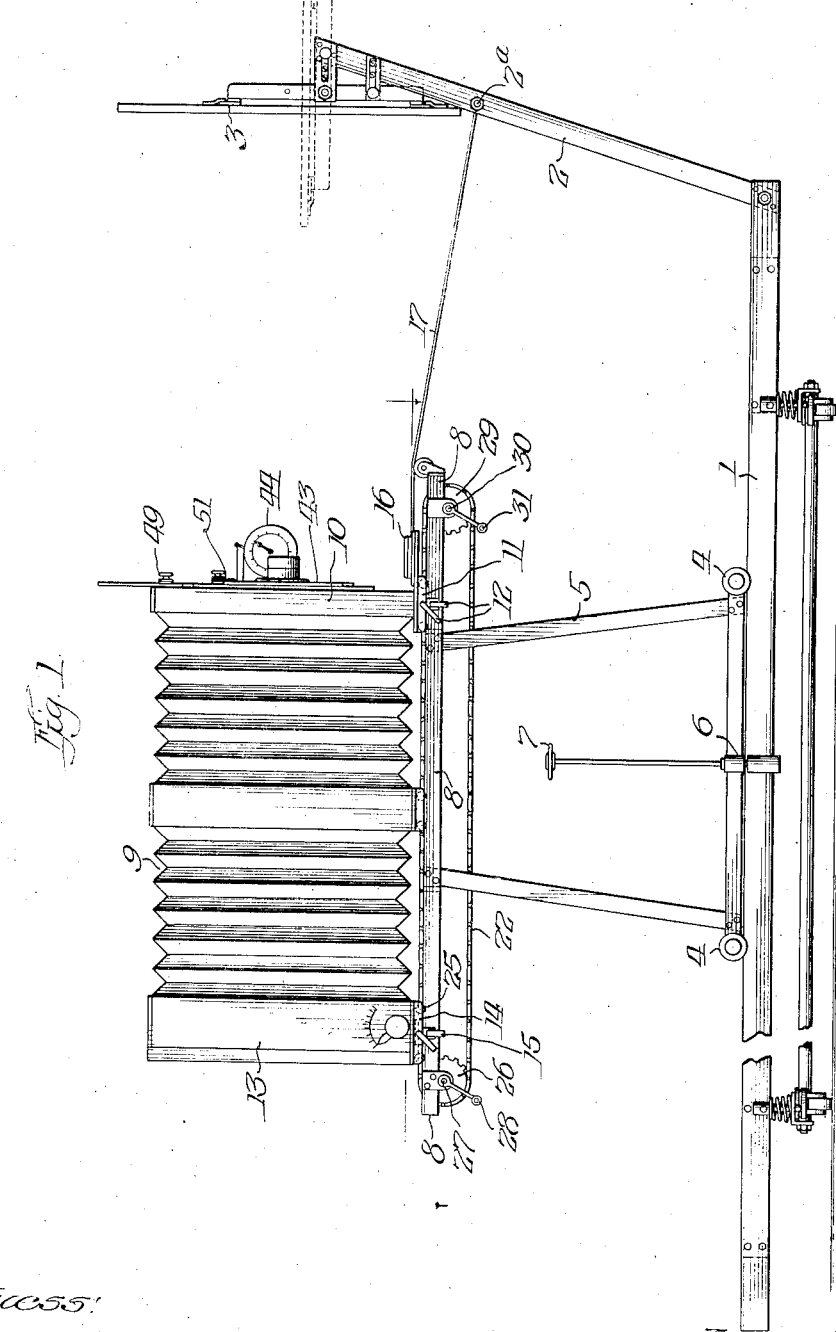

Sept. 1, 1925.
R. R. ROBERTSON
PHOTOGRAPHIC COPYING APPARATUS
Filed April 13, 1922     6 Sheets-Sheet 2
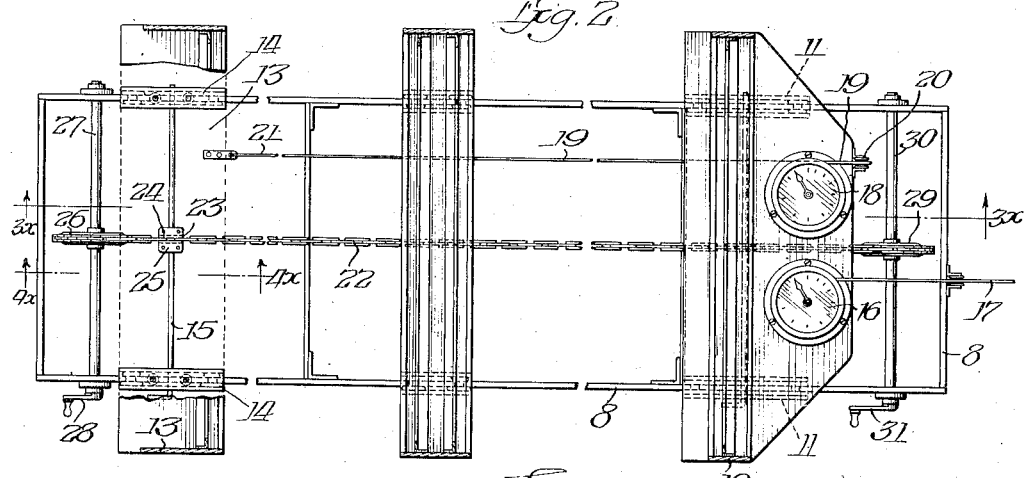
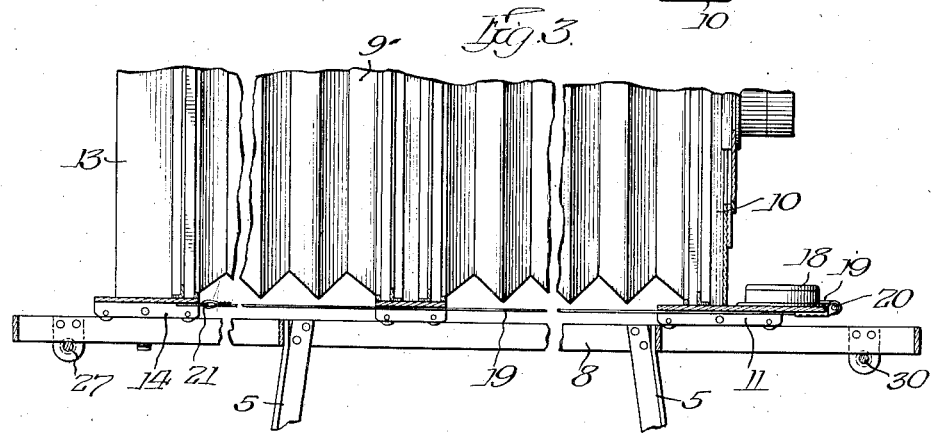
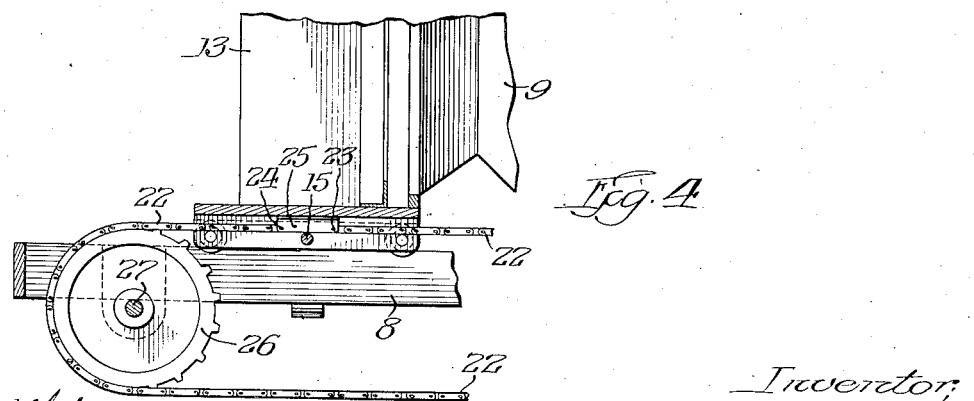
Witness:
Geo. C. Davison
Inventor:
Robert R. Robertson,
By Wilkinson, Huxley, Byron & Knight
Attys.

Sept. 1, 1925.
R. R. ROBERTSON
1,551,698
PHOTOGRAPHIC COPYING APPARATUS
Filed April 13, 1922    6 Sheets-Sheet 3
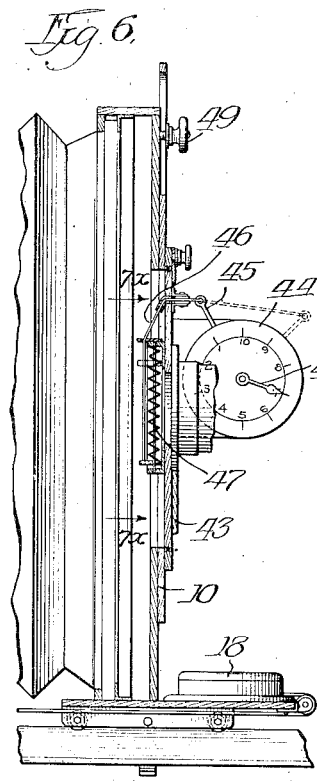
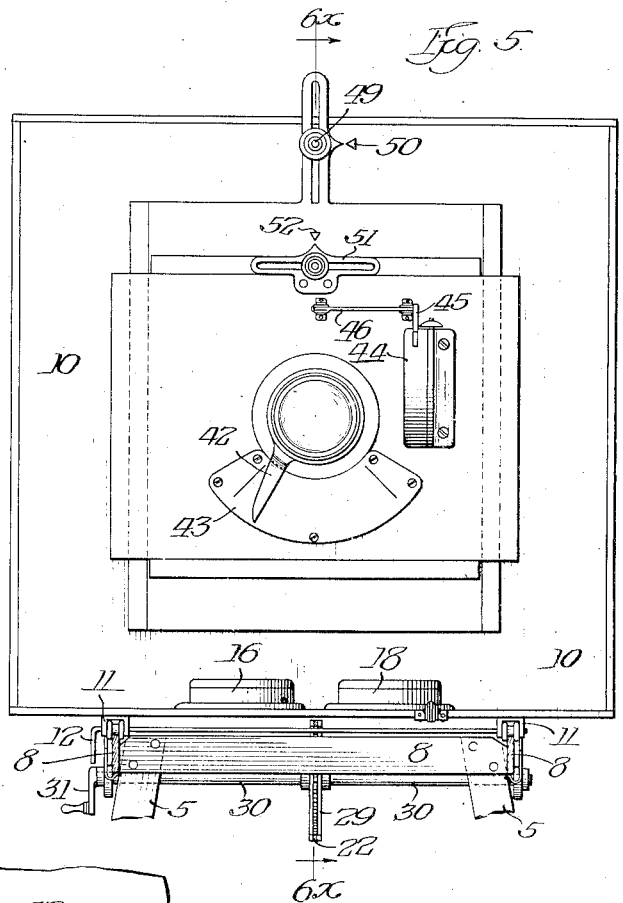
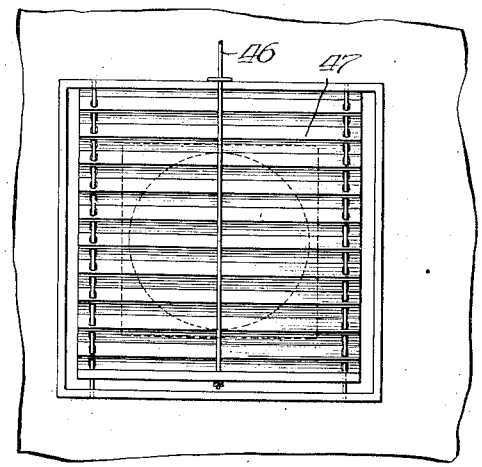

Sept. 1, 1925.
R. R. ROBERTSON
1,551,698
PHOTOGRAPHIC COPYING APPARATUS
Filed April 13, 1922   6 Sheets-Sheet 4
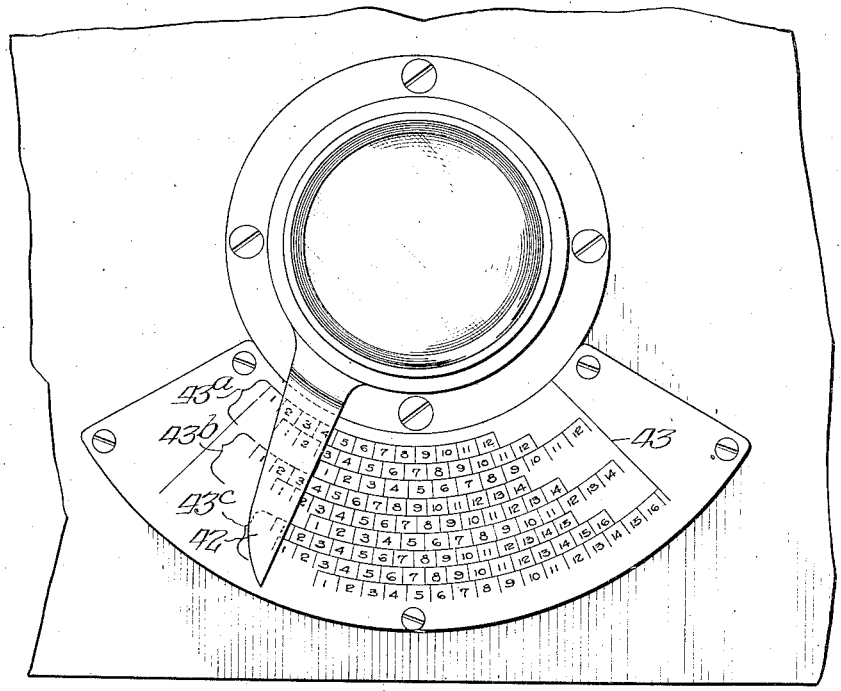
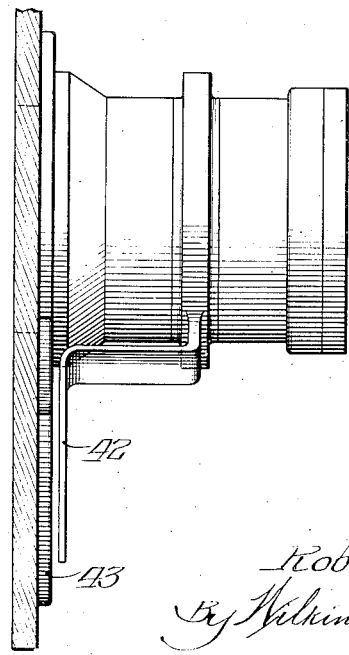

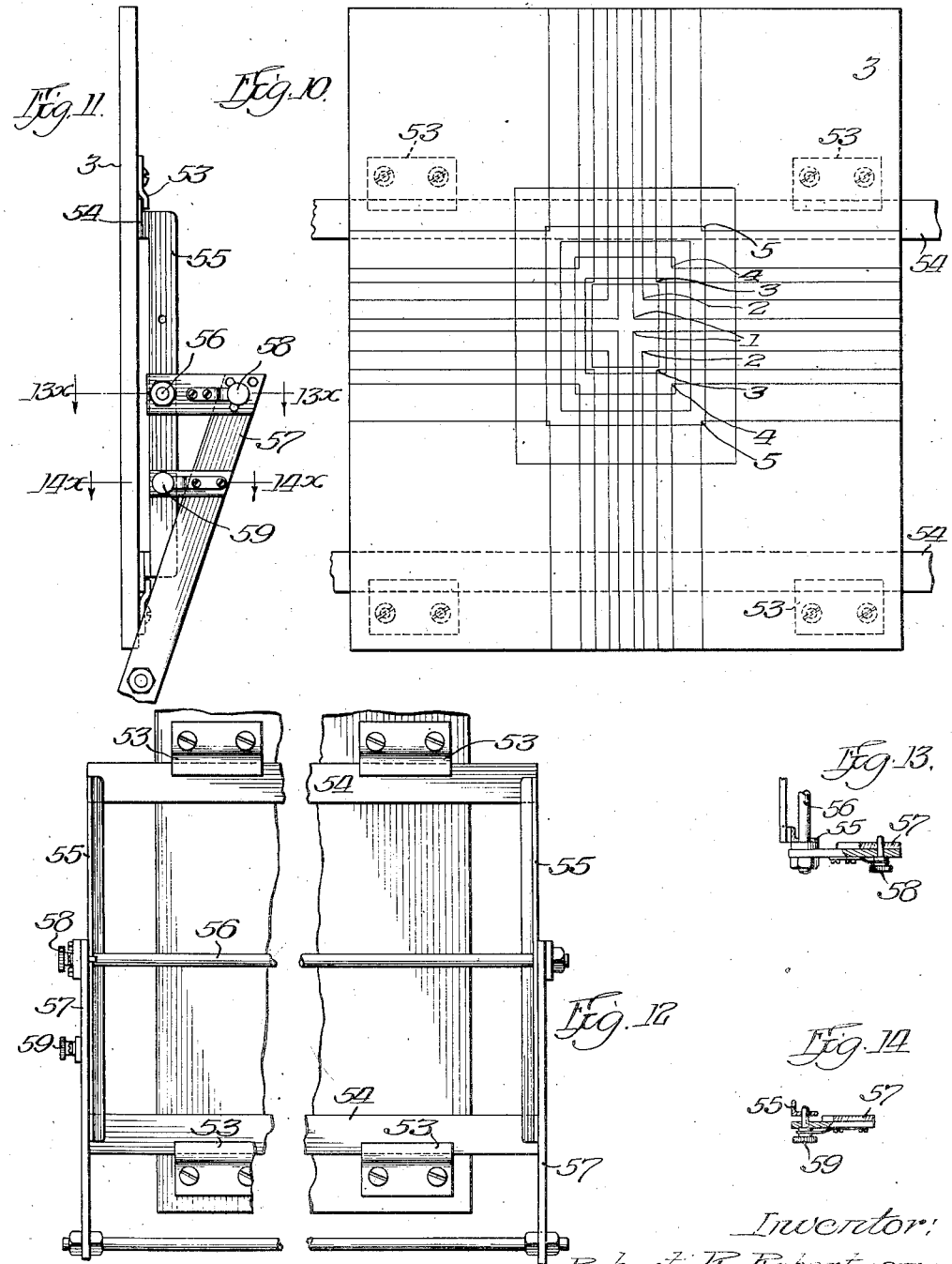

Sept. 1, 1925.                                        1,551,698
R. R. ROBERTSON
PHOTOGRAPHIC COPYING APPARATUS
Filed April 13, 1922          6 Sheets-Sheet 6
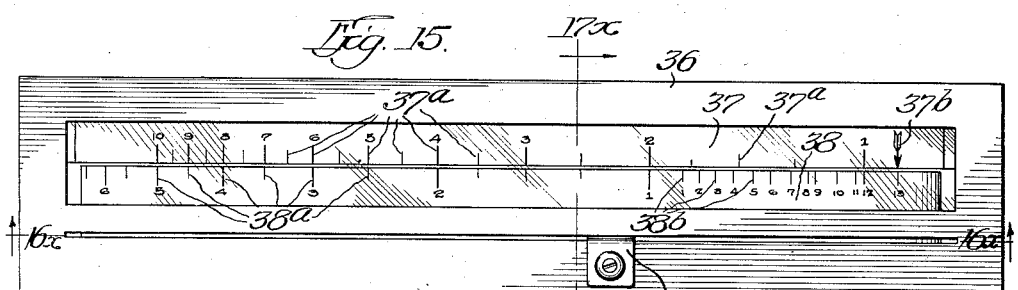
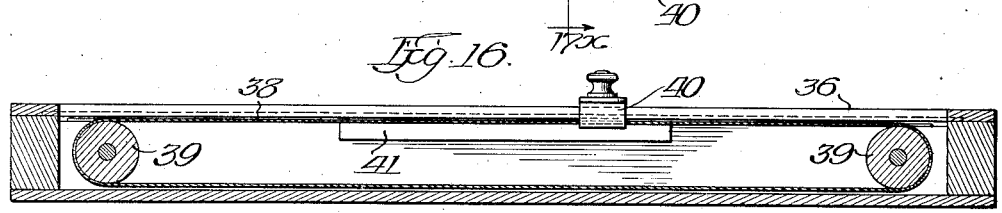
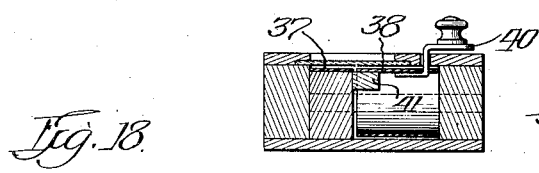
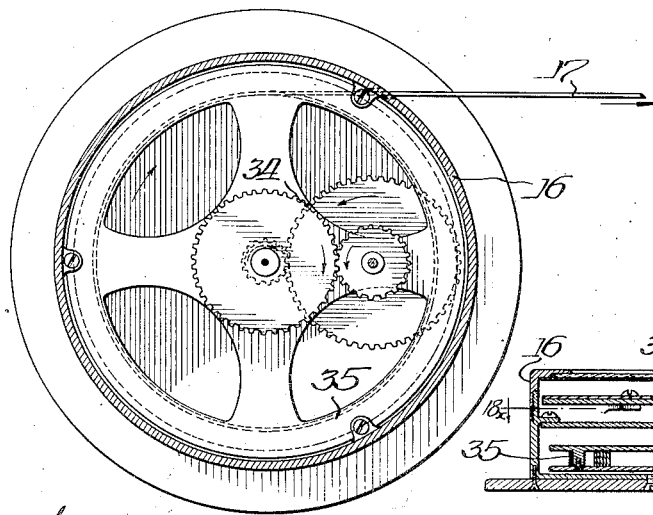
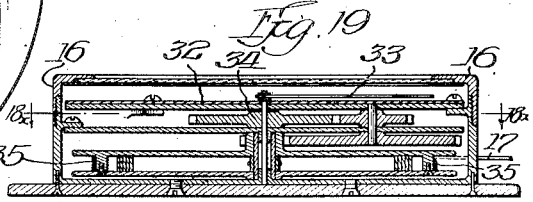
Inventor:
Robert R. Robertson,
By Wilkinson, Huxley, Byron, & Knight
Attys.

Patented Sept. 1, 1925.

1,551,698

UNITED STATES PATENT OFFICE.

ROBERT R. ROBERTSON, OF EVANSTON, ILLINOIS.

PHOTOGRAPHIC COPYING APPARATUS.

Application filed April 13, 1922. Serial No. 552,213.

*To all whom it may concern:*

Be it known that I, ROBERT R. ROBERTSON, a citizen of the United States, residing at Evanston, in the county of Cook and State of Illinois, have invented certain new and useful Improvements in Photographic Copying Apparatus, of which the following is a specification.

This invention relates to an apparatus for use in producing printing forms from copy, photographically, and particularly to the means for exposing the sensitized plates in the production of negatives which are employed in making printing forms, by such methods, for instance, as half-toning, zinc etching, or the like.

According to the present practice, when half-tone, zinc etching, or other printing plates are to be produced photographically, a copy sent in with the order is handled separately; the camera is adjusted with considerable expenditure of time to get an image of required dimension; the stop or light diaphragm adjustments are arranged according to the judgment of the operator to suit the particular ratio of reproduction and the several different exposures required for each plate, such as exposure for detail, exposure for middle tone, and exposure for high lights and the timing of these exposures, usually made by removing and replacing the lens cap, is likewise a matter of judgment. Thus, there is no definite control over the operation, as by empirical data bearing definite relationship to the ratio of reproduction and exposures to be made, nothing to guide the operator in determining the distance and focal adjustments of the camera other than his own observation of the ground glass, and nothing but his judgment to determine the light opening required.

The present invention has for its object to provide photographic copying apparatus in which the adjustment of lens distance, which determines the ratio of reproduction dimensions to those of the copy, the corresponding focusing adjustment and the several adjustments of the light opening appropriate to detail middle tone and high light exposures in each change of reproduction ratio, can all be made in accordance with a prescribed formula or measurement indication; also to provide means for determining positions of copy upon a copy board in accordance with the same data; also to provide means for computing comparison of dimensions of copy with those prescribed for the reproduction, in terms of an arbitrarily or otherwise established scale of apparatus adjustment, so that by associating with each copy piece, a scale designation so obtained, and using such designation as a guide in the conduct of the work, the various adjustments of the apparatus equipped with gauges calibrated in terms of said established scale, can be effected with accuracy and dispatch, and the element of human judgment as well as the time expended in exercising the same will be substantially eliminated.

A further object of the present invention is to provide means for coordinating the camera position with the copy board so that the position of the image on the exposure plate can be predetermined by merely selecting the position of the copy on the copy board; also to provide copy position on the copy board, designated in terms of the established scale, which, when occupied by copy pieces, will insure location of the several images, separately made upon one and the same plate, with marginal spacing appropriate to the lens distance and consequent reduction of such spacing, thereby guarding against light leakage from one exposure area to another.

In carrying out the invention, a classification gauge is provided through means of which work to be copied or reproduced can be classified according to ratio of reproduction, the gauge comprising two independent scale members calibrated in terms of dimensions respectively, of the copy and of the reproduction form, relatively movable to bring a prescribed reproduction dimension into coincidence with a corresponding copy dimension, and having in addition to these dimension scales, a pointer on one scale member and a third or classification scale on the other scale member, hereinafter referred to as the established scale, and the readings of which will indicate ratios of reproduction, and camera adjustments appropriate thereto, being deductions from a comparison of the two sets of dimensions named. The camera, bodily movable to and from the copy board, is provided with means for accurately measuring the distance of its lens therefrom, and expressing such distance in terms of the established or classification scale, so that by adjusting the camera until its reproduction gauge indicates the classification member on the copy the exact size of reproduction may be insured without inspection of the ground glass. The camera is also provided with means for indicating its focal adjustments or distance between the exposure plate and the lens, expressed in terms identical with those of the lens distance indicator, so that by causing identical readings on these two indicators the focal distance will always be exactly right for the lens distance. The camera is further provided with diaphragm adjusting means associated with a scale which reads in terms of the classification designations so that the light opening can be determined appropriately to the ratio of reproduction; and this diaphragm scale is subdivided into a plurality of groups for instance, three, corresponding, respectively, to the character of exposure, or character of screen employed in front of the negative, for instance, a scale reading in terms of classification but computing the detail light opening appropriate to a predetermined ratio of reproduction; a correspondingly calibrated scale that would make the same deduction as to middle tone light opening, on the same classification of work, or appropriate to the same ratio of reproduction; and a scale calibrated in the same classification terms which would deduce the proper light opening for high light exposure, in making the same ratio of reproduction.

The shutter timing device of the camera is of a nature which adapts it to determine the time of exposure appropriate for different reproductions. Since light effect is the product of size of diaphragm opening by the duration of exposure, the varying of one of these factors, namely the size of opening, according to the classification scale, will be sufficient to modify the light to suit ratio of reproduction. Hence the shutter timing for the several exposures on a plate being once determined appropriately to the lens, light source, etc., will remain substantially constant and the shutter gauge will read in the denomination of time, leaving the light opening gauge to carry the classification numbers. The copy board is coordinated in its work with the various adjustments of the camera, first, by providing the camera with vertical and horizontal adjustment markers which determine coincidence between the focal axis and the center of the board, and, second, by having the area of the board subdivided into symmetrically related copy squares of progressively increasing distance from the center of the board, and having these distances calibrated in terms of classification, so that the board can not only be used for holding a plurality of pieces of work of identical classification, which adapts the work to be copied simultaneously, but the work-pieces can be positioned on the board in the respective areas corresponding to the particular classification, and thereby develop distance between proximate margins of the exposure areas upon the plate sufficient to prevent light leakage from one exposure zone to another where the images are being cast, separately upon a single plate.

In the accompanying drawings—

Figure 1 is a side elevation of a complete reproducing apparatus embodying the several features of the present invention, with the exception of the classification gauge;

Figure 2 is a top plan view of the camera and its bed, with portions omitted to disclose parts immediately concerned with the invention;

Figure 3 is a vertical longitudinal sectional view, the section being taken on the line $3^x$—$3^x$ of Figure 2;

Figure 4 is a section on the line $4^x$—$4^x$ of Figure 2, on an enlarged scale;

Figure 5 is a front elevation of the camera and its bed;

Figure 6 is a vertical longitudinal section of the same on the line $6^x$—$6^x$ of Figure 5;

Figure 7 is a detail view of a form of exposure shutter that may be used in connection with the disclosed form of timing device;

Figures 8 and 9 are, respectively, front and side elevations of the diaphragm adjusting means;

Figure 10 is a front elevation of the copy board;

Figure 11 is a side elevation of the same;

Figure 12 is a rear elevation of the same with parts broken away;

Figures 13 and 14 are detail views of means for locking the copy board in its loading position and in its exposure position;

Figure 15 is a top plan view of the classification gauge;

Figure 16 is a vertical longitudinal section on the line $16^x$—$16^x$ of Figure 15;

Figure 17 is a transverse section on the line $17^x$—$17^x$ of Figure 15;

Figure 18 is a horizontal section of one of the two distance indicators; and

Figure 19 is a vertical axial section of the same.

Referring to Figure 1, 1 represents a portable track carrying at one end a standard 2, which receives a copy board 3 and having supported upon it, through means of wheels 4 which facilitate longitudinal traverse, a carriage 5 adapted to be fixed in position by the anchoring clamp 6 under control of handle 7. As shown in said figure, as well as in Figures 2 to 6, the carriage 5 embodies in its construction a camera bed 8 upon which is mounted any approved construction of commercial reproducing camera 9. Camera 9 embodies in its construction a lens frame 10 slidably mounted upon the track 8 through the medium of roller bearing shoes 11 adapted to be fixed in position by locking clamp 12, and a focusing frame 13 slidably mounted through the medium of roller shoe 14 and likewise provided with a locking clamp 15. As is well understood, the ratio of the dimensions of the image focused upon the plate in the frame 13 will be controlled by the distance of the lens frame 10 from the copy board 3, the focal distance between frame 13 and frame 10 being adjusted according to the distance between frame 10 and board 3. The present invention contemplates determining this adjustment, which fixes the ratio of reproduction, through the use of empirical data ascertained through the medium of a gauge herein referred to as a classification gauge, and to have this data expressed in characters which can be read directly upon a measuring gauge associated with the lens frame adjustment. Accordingly, 16 represents a gauge which is so connected with lens frame 10 as to be movable with it, and this gauge has a flexible connector 17 extending to a fixed point 2ª upon the standard 2 so that the paying out of the connector will develop a reading upon the gauge 16 which will indicate a position of the lens frame 10 that will develop upon the focusing plane in frame 13, an image, the dimensions of which will bear precisely the desired ratio to the dimensions of the copy on the board 3 which is to be reproduced. The indicia appearing on the distance gauge 16 are called classification marks in this specification because they not only define lens adjustments corresponding to reproduction ratio, but serve the additional function of permitting the copy pieces which have been subjected to calculation in the proportioning scale, to be grouped or classified according to such ratio of reproduction, and the exposing collectively of a plurality of copy pieces thus placed in any one class or group, or the excessive exposure of all the groups or copy pieces that can be treated with one camera adjustment. Such a procedure obviously results in great economy of operatives' time and sensitized plate consumption.

Since the focal distance between frames 10 and 13 will vary with changes in the lens distance between board 3 and frame 10, and it becomes desirable to fix the focal adjustment in definite relation to the lens adjustment. The present invention provides a secondary distance gauge 18 in fixed relation to the lens frame 10 and connects the same through a flexible connector 19, passing over pulley 20, to a fixed point 21 on the focusing frame 13. The secondary distance gauge 18 is calibrated in terms identical with those of the gauge 16, so that by first adjusting frame 10 until the proper reading is observed on gauge 16 and then adjusting frame 13 until identical reading is observed on gauge 18, a ratio of reproduction and accuracy of focus corresponding thereto will both be established.

Since it is desirable to quickly adjust the focal distance, and to do so from operators' positions either at the front of the machine, where the gauges 16 and 18 can be simultaneously observed, or from the rear of the machine, where the ground glass can be observed, an endless chain 22 has its ends 23, 24 united to the frame 13 through the medium of the anchoring plate 25, and passes around a pulley 26 on shaft 27 controlled by crank 28 at the rear end of the bed 8 and around pulley 29 on shaft 30 which is controlled by crank 31 at the front end of the bed 8; and through this means, and by the simple turning of either of the cranks 28, 31, the focal distance can be determined at will.

A construction of distance gauge suitable for the purposes of both gauge 16 and gauge 18 is shown in Figures 18 and 19, wherein 32 represents a fixed dial and 33 an index hand revolving concentrically therewith. Marginal calibrations on dial 32 will be designated with numbers indicating reproduction ratios or classification numbers, and, as stated, these will be identical upon the dials of the two distance gauges. Index hand 33 is revolved through the medium of reduction gear 34 from a spring drum 35 upon which the flexible connector, namely connector 17 of the lens gauge, or connector 19, of the focus gauge, is wound. Spring drum 35 serves the function of paying out the connector, under increase of the distance to be measured and of automatically rewinding it as such distance diminishes.

A classification gauge or proportioning gauge adapted to serve the purposes of the present invention is illustrated in Figures 15, 16 and 17, wherein 36 represents a housing containing a fixed scale 37 with calibrations 37ª in inches and fractions thereof, or other desired units of measurements, and a movable scale 38 carrying calibrations 38ª in like terms of measurements. The movable scale 38 is mounted to travel about guide rollers 39 and to be moved at will through means of the traveler 40. 41 represents a fixed ledge or table over which the movable scale travels and by which it is supported in reading relation to the scale 37. Fixed scale 37 is further provided with an indicator 37ᵇ; and movable scale 38 is provided with a separate set of calibrations 38ᵇ adapted to coact with the indicator 37ᵇ to give readings which constitute deductions derived from association of measurements marked on the movable scale 38 with measurements marked on the fixed scale 37. This separate set of calibrations 38^b, on the movable scale 38, the third scale on the classification gauge may be arbitrarily established in terms of numbers, letters or otherwise, identical with those on the distance gauges 16 and 18, and the reading thereon resulting from each comparison of existing copy dimension with prescribed reproduction dimension, is marked upon the copy and becomes its classification number throughout the process.

The method of using the proportioning gauge or classification gauge 36 is as follows: When copy comes into the establishment for reproduction, with instructions to develop therefrom a printing form of one or more specified dimensions, the number on the movable scale 38 corresponding to a prescribed dimension of the reproduction is found and brought into registry with the number on the fixed scale 37 which indicates the corresponding actual dimension of the copy, found by measurement thereof. The movement of scale 38 that brought these two members into registry, will have brought, opposite the indicator 37^b, one of the series of characters, (in the present illustrative instance, Arabic numerals), arbitrarily selected for the graduations on the classification scale 38, and this is taken to designate the classification or reproduction ratio of the work. This number, as already stated, follows the copy piece throughout the operation. It will be the number to be read upon the distance gauge 16, to make the proper size of reproduction, and also upon the distance gauge 18 in adjusting the camera to proper focus; it will also be the number to be read upon the diaphragm gauge hereinafter described. Thus, if a copy be submitted with instructions to make a printing form therefrom, a designated dimension of which is to be two inches, and actual measurement of the corresponding dimension on the copy is four inches, the figure 2 on the movable scale 38 will be placed beneath the figure 4 on the fixed scale 37. The number 13 will now appear beneath the indicator 13^b, and this number will be marked upon or otherwise applied to the copy piece, and the latter with such other instructions as may be necessary, passes to the photographer. When the photographer receives the copy, he observes the classification number thereon and adjusts his camera until gauge 16, gauge 18, and other gauges concerned with the camera adjustment, read with the same figures. Where a large quantity of work is being received, moreover, the copy pieces will be assorted or grouped to bring together all the pieces bearing identical classification marks, and all the copy pieces in any one group will be photographed collectively so far as the size of the copy board and plate will permit, or at least successively and without readjusting the camera, and with great saving of time.

Regulation of light volume, required in photographic work of the kind for which the present invention is especially intended varies with the ratio of reproduction. The larger the reproduction, the greater should be the volume of light admitted. The present invention employs any standard form of means for regulating the light opening, for instance, an arm 42 for regulating an iris diaphragm and, in connection therewith, a gauge 43 calibrated to indicate light openings appropriate to different ratios of reproduction. Gauge 43 is marked with the same classification numbers, which are utilized for other adjustments of the camera, but the ratio of light openings to size of reproduction, also varies with different exposures made in actinizing each plate, for instance, an exposure for detail effect an exposure for middle tone effect, and an exposure for high light effect. Moreover, these exposures may be produced with different meshes or screens before the plates. Hence, the area of light opening must be varied not only according to ratio of reproduction but also according to the plurality of other factors, for instance the character light to be developed, and the character of screen used. Hence, in carrying out the present invention, the scale 43, which cooperates with the indicator arm 42 is constructed with three groups of calibrations 43^a, 43^b and 43^c so located that their readings give light openings respectively, corresponding to detail, middle tone and high light exposure; each of these groups is subdivided into three scales indicated as A, B, and C, so positioned in the group that their readings give light openings that correspond to different screens employed and each individual scale is subdivided according to the classification scale, and marked with numbers 1, 2, 3, etc. that give readings according to ratio of reproduction. Thus by reading from the instructions accompanying the copy, ratio of reproduction and the class of screen to be used, the photographer selects from the calibration gauge 43, the screen scale A, B or C, according to the screen used, and then moves arm 42 into register with the Arabic numeral in the first of the group, corresponding to classification or ratio of reproduction, sets his shutter for the proper time and makes the detail exposure. He then selects the second scale in the screen group, and goes through the same procedure to produce his middle tone exposure; and finally proceeds in the same way in connection with the third scale of the group. Before making these exposures he will set the proper screen in front of the plate at the rear end of the camera.

While timing of exposure is an element bearing directly upon the class of work to be produced, it will be constant for all exposures in any given class. The present invention provides for timing through means of clockwork 44 having a controlling arm 45 adapted to be connected through cord 46 with any suitable form of shutter 47. In the present instance, the shutter is a folding curtain closing by gravity, but adapted to be opened by gathering its folds through the medium of the cord 46, which in turn results from throwing the arm 45 from the full line position to the dotted line position in Figure 6, where it remains until the clockwork, after lapse of the predetermined time for which it is set, releases the arm and permits the shutter to close. In order to accurately determine the duration of shutter opening, an indicator hand 48 made to move over the dial of the time piece 44, regulates the lapse of time until the arm 45 will be released.

In order to coordinate the position of the focal axis with the center of the copy board 3, the camera has vertical adjusting clamp 49 with indicator 50, and horizontal adjusting clamp 51 with indicator 52. When the indicators 50 and 52 are in registry, the focal axis will be in direct line with the center of the board 3.

In order to adapt the board 3 to position the copy pieces with accuracy according to the classification of reproduction, thereby not only symmetrically disposing the reproduction images upon the plate but insuring proper distance between proximate margins of the several images to avoid light interference where the reproduction is small, and the spaces between the images correspondingly reduced, the board has its area symmetrically subdivided on opposite sides of its vertical and horizontal diameters into a plurality of areas or zones corresponding to the classification of work to be done, for instance, areas 1, 2, 3, 4, and 5, on each quadrant of the board.

Thus if the reproduction is one to one, four copy pieces may be mounted in the squares indicated by numeral 1. But if the reproduction is greater, for instance, in the proportion indicated by any of the classification numerals 2, 3, 4, 5, etc. the copies will be spaced accordingly by having their proximate corners not nearer than the squares indicated by those numerals.

The board 3 may be of known construction. For instance, it may be secured by claws 53 on the cross rails 54 so that it can be accurately located in position; and its frame 55 may be trunnioned at 56 upon the bracket 57 so that it may be laid in a horizontal position and secured by the spring pin 58 while applying the copy pieces to the board and then swing to a vertical position and there secured by the pin 59 to hold it in exposure position.

I claim:

1. In a photographic reproduction apparatus, a copy holder, a camera, said camera and copy holder being relatively adjustable to determine the distance between them, a gauge controlled by said distance calibrated in terms of an established scale, and an adjustable light opening diaphragm on the camera having a gauge also calibrated in the terms of said established scale; the calibration of the last-named gauge comprising scales corresponding to different characters of exposures required, each of which scales embodies the terms of said established scale.

2. In photographic reproduction apparatus, a copy holder, a camera, said camera and copy holder being relatively adjustable to determine the distance between them, a gauge calibrated in terms of an established scale, and an adjustable light opening diaphragm on the camera having a gauge, also calibrated in the terms of said established scale said camera being constructed to receive, interchangeably, screens of different character; and the calibration of the diaphragm gauge comprising a group of scales, each of which is marked in terms of said established scale, and each of which corresponds to a specific photographic screen to be used.

3. In photographic reproduction apparatus, a copy holder, a camera, said camera and copy holder being relatively adjustable to determine the distance between them, a gauge calibrated in terms of an established scale, and an adjustable light opening diaphragm on the camera having a gauge, also calibrated in the terms of said established scale; said camera being adapted to receive, interchangeably, a plurality of different screens, and the calibrations of the diaphragm gauge comprising a plurality of groups of scales; the groups being positioned to produce gauging effects appropriate to different classes of exposures, each group comprising a plurality of scales, respectively, appropriate in gauging effect to different types of screens employed in the camera and each scale being calibrated in terms of said established scale.

4. In photographic reproduction apparatus, a copy holding member, a camera member, one of said members being movable relatively to the other to vary the distance between them and determine the ratio of reproduction to original copy, a distance gauge fixedly related to one of said members calibrated in terms indicative of the ratio of reproduction, a positive connector between said distance gauge and the other of said members through which relative movement of the members develops a registering movement in the gauge, means for imparting focusing movement to the camera, and a focusing gauge actuated by focusing movements calibrated to correspond with the distance gauge.

5. In a photographic camera, an adjustable focal frame, and means for adjusting said frame extending from end to end of the camera, and having means for actuating it from either end thereof.

6. In a photographic camera, an adjustable focal frame, and means for adjusting said frame extending from end to end of the camera, and having means for actuating it from either end thereof; said camera having a focusing indicating gauge at the end thereof remote from said focal frame.

7. In a photographic camera, an adjustable focal frame, and means for adjusting said frame extending from end to end of the camera, and having means for actuating it from either end thereof; said adjusting means comprising an endless chain, sprocket shafts on which said chain travels, and means for rotating either of said shafts.

8. In photographic reproduction apparatus, a camera, focusing means for said camera a copy holder subdivided by vertical and horizontal diameters into sections, having these sections, respectively, laid off in progressively decreasing parallel sided areas, and with their proximate corners at progressively increasing distances from said diameters and identical calibrations indicating the several areas of the copy board and focusing adjustments of the camera.

9. In photographic reproduction apparatus, a camera, focusing means for said camera a copy holder subdivided by vertical and horizontal diameters into sections, having these sections, respectively, laid off in progressively decreasing parallel sided areas, and with their proximate corners at progressively increasing distances from said diameters, inversely proportional to ratios of reproduction to be accomplished and identical calibrations indicating the several areas of the copy board and focusing adjustments of the camera.

10. In photographic reproduction apparatus, a camera and a copy holder relatively adjustable to determine the distance between them according to ratios of reproduction, and a gauge for indicating the distance in terms of an established scale; the copy holder having its area subdivided by intersecting diameters into rectangular sections; and these sections being, respectively, laid off into progressively decreasing parallel sided copy areas, with distances between their proximate portions calibrated in terms of said established scale and in correspondence with ratios of reproduction to be effected.

11. In photographic reproduction apparatus, a gauge comprising relatively movable scales, one of which is calibrated in terms of dimensions of original copy, and the other in dimensions to be selectively prescribed for a reproduction; one of said scales carrying an indicator and the other carrying a secondary scale calibrated in terms indicative of the relations of said dimensions and reproducing mechanism adjustable in accordance with different ratios of reproduction to be made, and calibrated identically with the scale of said gauge.

Signed at Evanston, Illinois, this 10th day of April, 1922.

ROBERT R. ROBERTSON.